(12) United States Patent
Fujimoto (10) Patent No.: US 7,080,563 B2
(45) Date of Patent: Jul. 25, 2006

(54) GAS FLOW MEASUREMENT APPARATUS AND METHOD FOR EVU LIGHT SOURCE

(75) Inventor: Kazuki Fujimoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 10/822,046

(22) Filed: Apr. 9, 2004

(65) Prior Publication Data

US 2005/0115333 A1    Jun. 2, 2005

(30) Foreign Application Priority Data

Apr. 11, 2003    (JP)    ............................. 2003-107539

(51) Int. Cl.
*G01F 1/00*    (2006.01)

(52) U.S. Cl. ........................................................ 73/861

(58) Field of Classification Search ..................... None
See application file for complete search history.

(56) References Cited

U.S. PATENT DOCUMENTS 6,232,613 B1 *    5/2001    Silfvast et al. .......... 250/504 R
6,590,959 B1 *    7/2003    Kandaka et al. ............ 378/119

FOREIGN PATENT DOCUMENTS

JP    09-320792    12/1997

* cited by examiner

*Primary Examiner*—Harshad Patel
(74) *Attorney, Agent, or Firm*—Morgan & Finnegan, L.L.P.

(57) ABSTRACT

A gas flow measurement apparatus measures flow of gas emitted from an EUV light source in a light source chamber that accommodates the EUV light source, and includes an absorber that receives light emitted from the EUV light source and introduced into the gas flow measurement apparatus.

15 Claims, 5 Drawing Sheets

GAS FLOW MEASUREMENT APPARATUS AND METHOD FOR EVU LIGHT SOURCE

This application claims a benefit of priority based on Japanese Patent Application No. 2003-107539, filed on Apr. 11, 2003, which is hereby incorporated by reference herein in its entirety as if fully set forth herein.

BACKGROUND OF THE INVENTION

The present invention relates to a gas flow measurement apparatus and method for measuring flow of gas molecules and a type of gas emitted from an extreme ultraviolet ("EUV") light source for an exposure apparatus that utilizes plasma emissions.

In manufacturing such fine semiconductor devices as semiconductor memories and logic circuits in photolithography technology, reduction projection exposure has conventionally been employed with UV light. A minimum critical dimension ("CD") transferable by the projection exposure is proportionate to a wavelength of light for exposure, and inversely proportionate to the numerical aperture ("NA") of a projection optical system. Transfers of finer circuit patterns thus have required light with a shorter wavelength, and the wavelengths of the used UV light have turned from an ultra-high pressure mercury lamp (i-line with a wavelength of about 365 nm) to KrF excimer laser (with a wavelength of about 248 nm) and ArF excimer laser (with a wavelength of about 193 nm).

The photolithography using the UV light, however, has the limits to satisfy the rapidly progressing fine processing of semiconductor devices. Accordingly, there has been developed a reduction projection optical system using EUV light with a wavelength, such as 10 to 15 nm, much shorter than that of the UV light, ("EUV exposure apparatus" hereinafter") for efficient transfers of very fine circuit patterns less than 0.1 μm.

Simultaneously, as shown in Japanese Patent Application publication No. 9-320792, an EUV light source is being developed for supplying EUV light to an exposure apparatus. A currently proposed EUV light source for an exposure apparatus includes two representative methods, i.e., laser produced plasma ("LPP") and discharge produced plasma ("DPP").

Figure 2:
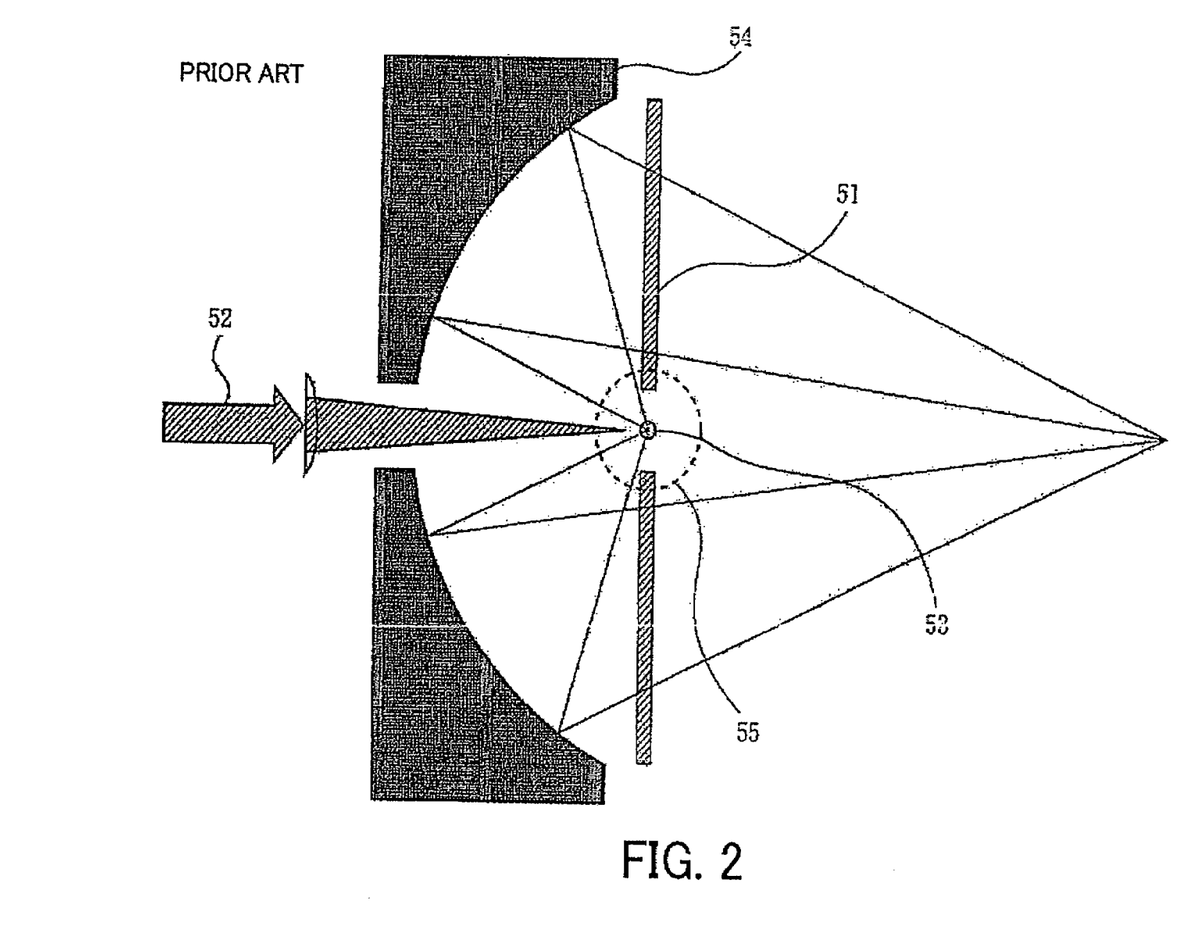
FIG. 2 is a schematic view for explaining a typical laser produced plasma EUV light source.

FIG. 2 is a schematic diagram of a LPP light source, which irradiates a high-intensity pulse laser beam 52 to a target material 51 in a vacuum chamber, generates high-temperature plasma 53, and emits EUV light with a wavelength of, e.g., about 13.5 nm from the emission point. The target material may use a metallic thin film, inert gas, droplets, etc., which are provided in the vacuum chamber by a means such as a gas jet and the like. For enhanced average intensity of EUV light emitted from the target, the pulse laser preferably has a higher repetitive frequency, and is usually driven at several kHz.

A supply of the target material 51 is vital to the LPP EUV light source. This target material scatters, when generating plasma, and causes damages and contaminations of a multilayer mirror 54 as a reflective optical element. These flying particles are generally referred to as debris. In order to prevent debris' adhesions to the multiplayer mirror, etc., a debris filter 55 called a foil trap is provided between the emission point and the mirror, a plasma generating part is purged with buffer gas, such as argon and krypton, having predetermined pressure to decelerate scattering debris. The target often uses gas to reduce debris, and this target does not generate debris. However, a nozzle for supplying the target gas should be provided near the plasma generating part, and a tip of the nozzle scatters due to sputtering, disadvantageously causing debris.

Figure 3:
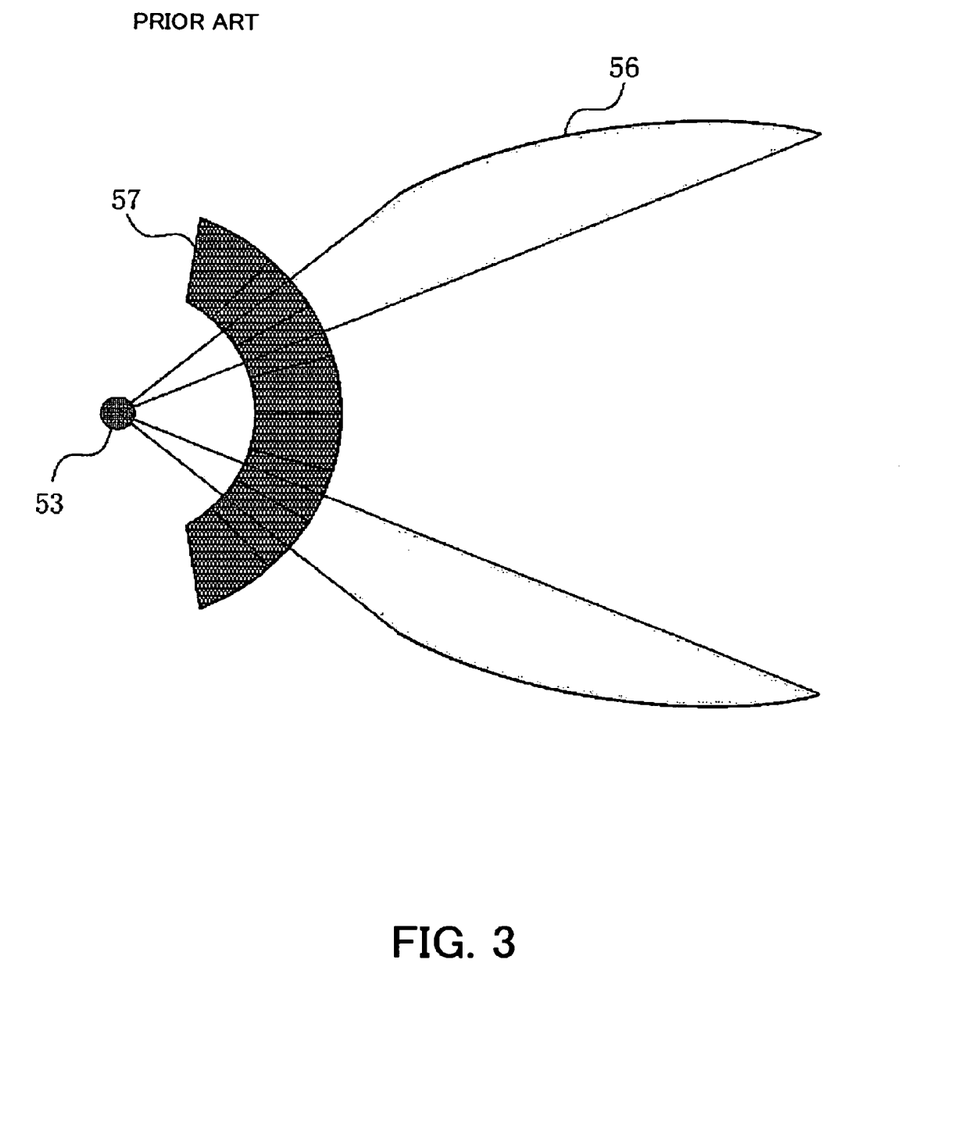
FIG. 3 is a schematic view for explaining a typical discharge produced plasma EUV light source.

FIG. 3 is a schematic view of a DPP light source, which flows gas, such as Xenon, through a hollow in an electrode (not shown), generates high-temperature plasma through discharges from high-density current pinches, and finally produces the EUV light. The DPP EUV light source also scatters debris from an electrode material due to discharges, and needs a debris filter 57 provided between an emission point and a mirror, fills gas, such as helium, having predetermined pressure to reduce scattering debris.

As discussed, both the EUV light sources supply gas for the target and buffer gas to prevent scattering of debris, and the plasma generating part is typically maintained at pressure of about 10 Pa.

The EUV light of about 13.5 nm used for exposure is easily absorbed in gas molecules and attenuates. Therefore, the EUV exposure apparatus is preferably maintained highly vacuum. Moreover, it is difficult to spatially partition a connection part between the EUV light source and the EUV exposure apparatus, because no partitioning window material exists which allows the EUV light to transmit without attenuations. As a result, it is difficult to prevent inflows of gas molecules from the light source to the exposure apparatus while the EUV light is being supplied. On the other hand, the inflow gas molecules that cause contaminations of an optical element in the exposure apparatus disadvantageously shorten the optical-element's life and deteriorate exposure performance in the exposure apparatus.

In order to prevent adverse influence of the gas molecules into the EUV exposure apparatus from the EUV light source, it is necessary to precisely measure a type and flow of the inflow gas molecules and to provide an appropriate filter, etc. according to the result.

Figure 4:
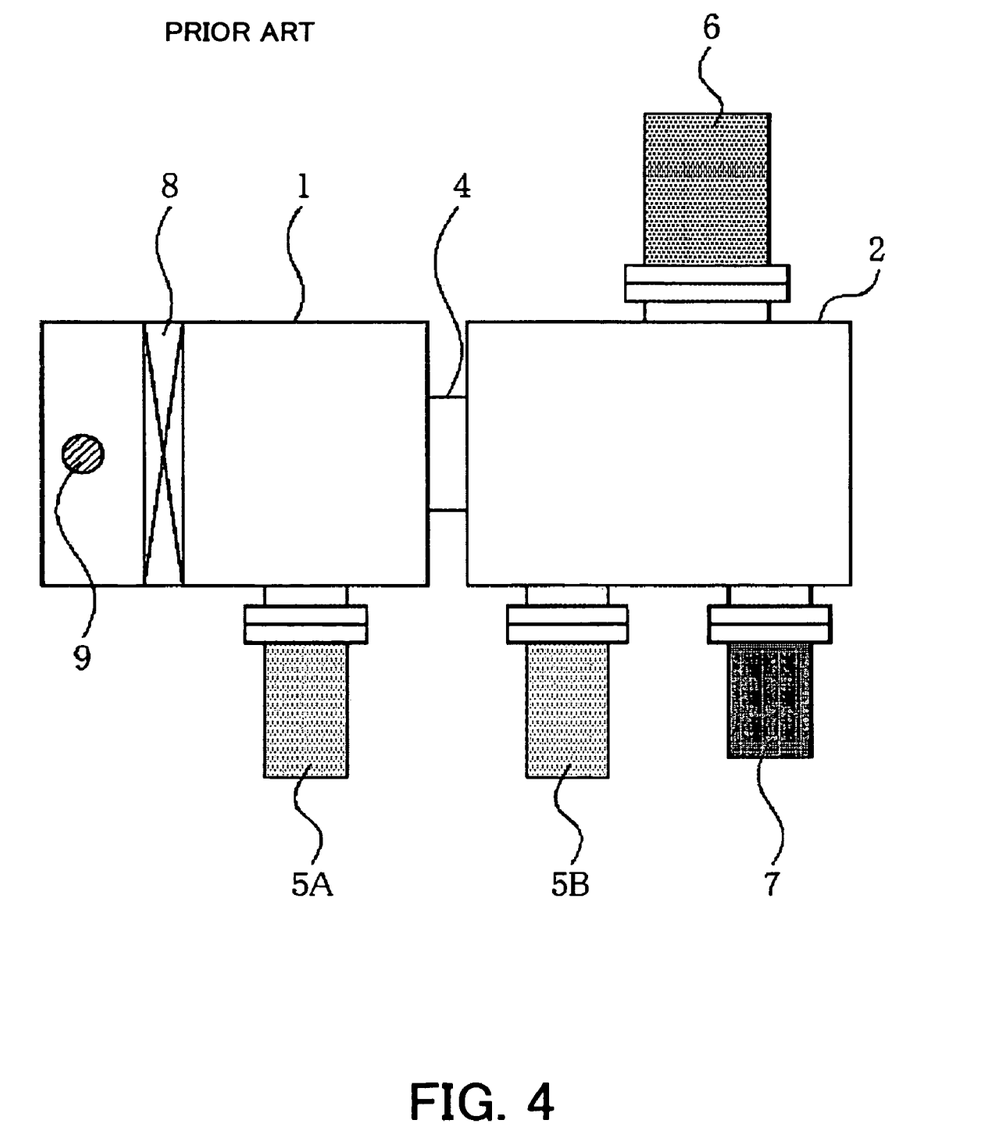
FIG. 4 is a view for explaining a conventional measurement apparatus for gas flow and partial pressure by gas type.

FIG. 4 shows a schematic view of an exemplary flow measurement apparatus or flowmeter. In FIG. 4, a first chamber 11 that accommodates a light source 19 and a second chamber 12 that simulates a chamber for an EUV exposure apparatus are connected by an orifice 14 having a known conductance. A vacuum gauge 15A is attached to the first chamber 11, while a vacuum gauge 15B, a vacuum pump 16 and a mass spectrometer 17 are attached to the second chamber 12.

Figure 5:
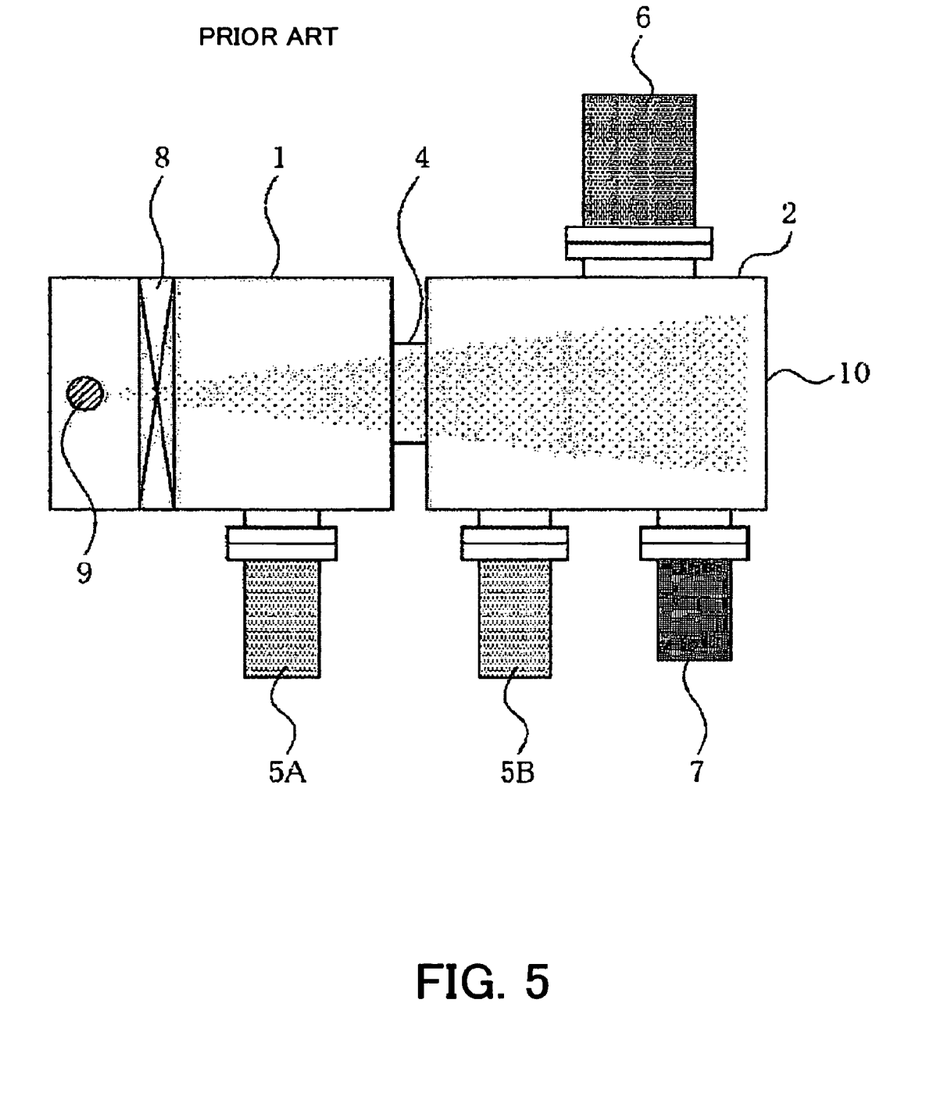
FIG. 5 is a sectional view of principal part in the conventional measurement apparatus for gas flow and partial pressure by gas type.

FIG. 5 is a sectional view of principal part in the conventional measurement apparatus for gas flow and partial pressure by gas type shown in FIG. 4, and shows measurements of the inflow of gas molecules that flow in the second chamber 12 when the EUV light is being generated. The inflow of the gas molecules into the second chamber 12 can be calculated from a pressure difference between the vacuum gauges 15A and 15B and the conductance of the orifice 14.

However, the method shown in FIG. 4 has the following problem: When the light radiated from the light source 19 is irradiated directly onto a chamber wall surface, the chamber wall desorbs and emits gas molecules. Since the EUV light source has large radiated light intensity and includes a large amount of light with a very short wavelength, a large amount of gas emitted from this chamber wall makes it difficult to precisely measure a type and flow of the gas molecules into the second chamber 12.

BRIEF SUMMARY OF THE INVENTION

Accordingly, it is an object of the present invention to provide a gas flow measurement apparatus of an EUV light source and a measurement method using the same, which can precisely measure a type and flow of gas molecules that flow in an EUV exposure apparatus from the EUV light source by preventing emissions of gas from a chamber wall due to light irradiations.

There is provided a gas flow measurement apparatus that measures flow of gas emitted from an EUV light source in a light source chamber that accommodates the EUV light source, and includes an absorber that receives light emitted from the EUV light source and introduced into the gas flow measurement apparatus, and a gas flow measurement method using the same.

DETAILED DESCRIPTION OF THE PREFERRED EMBODIMENTS

Figure 1:
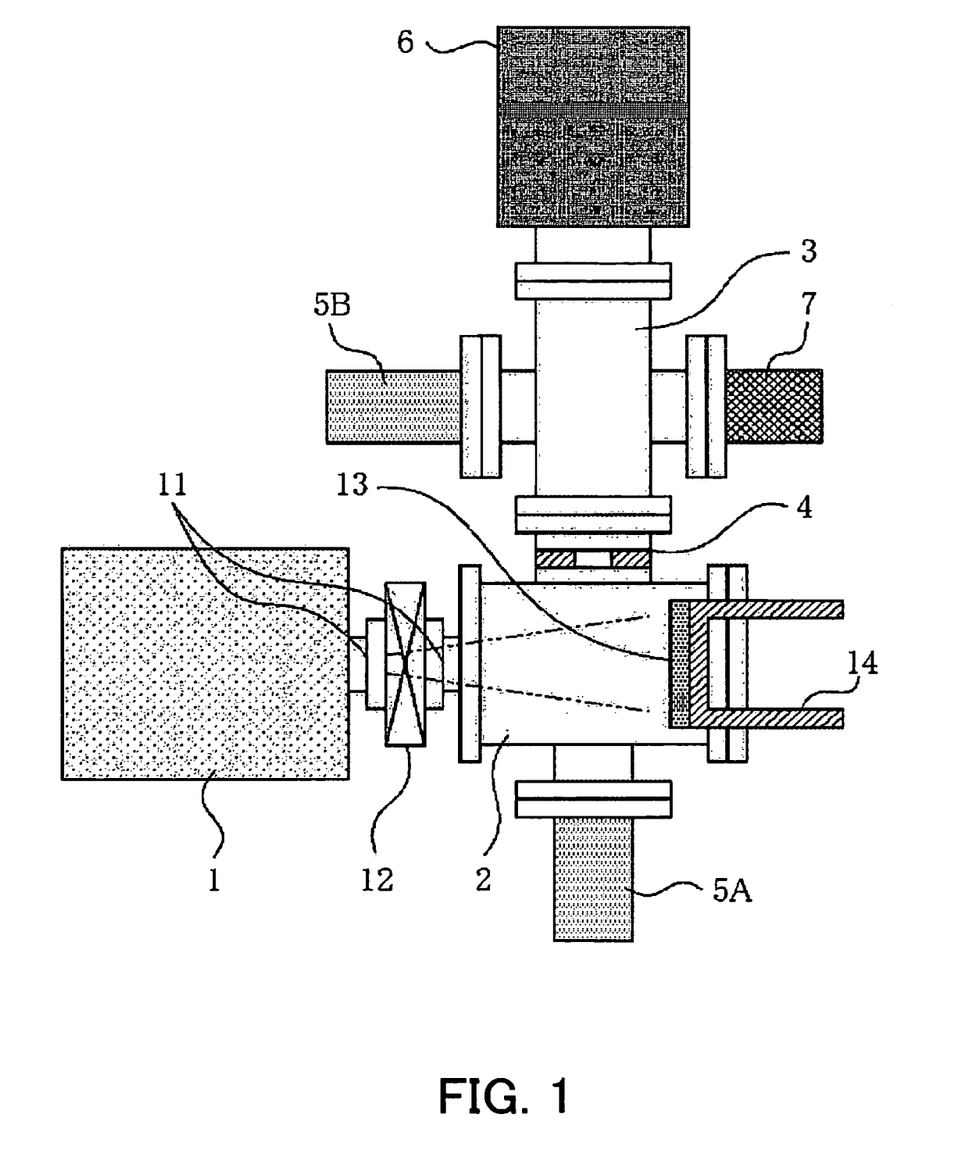
FIG. 1 is a sectional view of principal part in a gas flow measurement apparatus for an EUV light source according to the present invention.

FIG. 1 is a sectional view of principal part in a gas flow measurement apparatus for an EUV light source according to the present invention. In FIG. 1, a first chamber 1 as an EUV light source that includes a plasma light source and a condenser mirror is connected to a second chamber 2 via a flange 11 and a gate valve 12. The second chamber 2 includes an absorber 13 that receives the light radiated form the EUV light source, and all the radiated light from the EUV light source is irradiated onto the absorber 13. A third chamber 3 is attached to the second chamber 2 via an orifice plate 4 having predetermined conductance.

The second chamber 2 is provided with a vacuum gauge 5A. A vacuum gauge 5B, a vacuum pump 6, and a mass spectrometer 7 are attached to the third chamber 3. Here, the vacuum gauges 5A and 5B are preferably the same type of vacuum measuring apparatus, and includes a combination, for example, of a Piranha gauge and a cold cathode for precise measurements of a wide pressure range.

The EUV light source used for the instant embodiment outputs the EUV light with wavelength 10–15 nm (containing 13.5 nm for use with exposure) at light intensity of 10 W, and radiates the light at light intensity of about 400 W in the entire wave range that includes other wavelengths. All the light radiated from the EUV light source is irradiated onto the absorber 13. When the absorber 13 is made of a material that causes few gas emissions in response to light irradiations, the absorber 13 absorbs the light radiated from the EUV light source by minimizing the gas emissions from the chamber walls, and enables a type and flow of gas molecules from the EUV light source to the EUV exposure apparatus to be measured precisely. Among light emitted from the EUV light source, that which causes gas emissions in response to the light irradiations has a wavelength smaller than the ultraviolet light, and the absorber 13 absorbs most of the light having such a short wavelength. Therefore, the light reflected on the surface of the absorber 13 has a relatively large wavelength, and is less likely to cause gas emissions from the chamber wall at different locations.

A material that causes few gas emissions in response to the light irradiations and is suitable for the absorber 13 can be determined by actually irradiating the light from the EUV light source onto absorbers made of various materials and by measuring the emitted gas amount. As a result of comparisons among various materials that are made flat by mechanical polishing and electropolishing and subjected to light from the predetermined EUV light source in vacuum, it is found that a large amount of gas is emitted irrespective of types of materials at the initial irradiations, the emission amount gradually decreases when the irradiation continues, and the gas emission amount becomes constant that depends upon a type of each material. There is a difference of about 500 to 2000 times between the gas emission amount at the initial irradiations and one that reduces to a constant amount. By irradiating the light from the EUV light source of the instant embodiment onto almost all the materials for about 30 hours, the emission amount becomes about twice to fifth times as large as the emission amount subjected to irradiations for a long time. Presumably, this is because the irradiation almost completely emits gas elements that have been adhered to a surface and inserted the surface vicinity. It is also presumed that the reason why gas emission is seen after the long irradiation is the gas elements in the material sequentially spread under the surface and then come out. In using the absorber 13 for an actual flow measurement, it is preferable to reduce the gas emission amount in advance by irradiating the light from the EUV light source for a predetermined time.

As a result of comparisons among gas emission amounts by material, pure metal without a gas element as a major ingredient element and an alloy that includes a combination of metal elements generally indicated a small gas emission amount, whereas ceramics as oxides or nitrides of a metal element generally indicated a large gas even after long time irradiations. Even pure metal and an alloy of metal elements have different emission amounts after long irradiations according to materials, presumably because amounts of gas elements differ according to different solubility of each gas element and different atmospheres in manufacture steps.

There is a significant difference in gas emission amount between a mechanically polished flat surface and an electropolished flat surface on the absorber even when the substrate material is common. It was observed that the electropolished absorber has a maximum gas emission about 100 times as much as that of the mechanically polished absorber at the initial time of irradiations of the light from the EUV light source, and often requires a longer time for the gas emission amount to reduce. Presumably, this is because the gas element is introduced into the material at the electropolishing time.

Cooling or non-cooling by a cooling pipe 14 provided on a rear surface of the absorber 13 results in different gas emission amounts when the EUV light source emits the light: Non-cooling is likely to result in the large initial gas emission amount and rapid reduction of the amount. It was observed that the emission amount after long irradiations is about twice as large as that with cooling. Presumably, this results from the temperature rise in the absorber, which promotes both gas emissions from a surface and mobility due to diffusions. According to this result, the gas description from a surface of the absorber needs the temperature of the absorber to be maintained high. When the gas flow is actually measured, the cooling pipe 14 provided on the rear surface of the absorber 13 maintains the temperature of the absorber 13 at predetermined temperature or smaller, so as to restrain emissions of gas molecules from the absorber 13 and improve the measurement precision.

Presumably, the gas emission amount in response to light irradiations from the EUV light source is almost proportional to the irradiated light intensity density. Therefore, the gas emission amount per unit area from each absorber material can be expressed as a gas emission amount per unit intensity of the irradiated light. Table 1 shows gas emission amounts from respective experimented absorber elements:

TABLE 1

| MATERIALS | SINGLE CRYSTAL Si CRACKED CEAVAGE PLANE | OXYGEN-FREE COPPER | | STAINLESS MECHANICAL POLISHING | PURE ALUMINUM ELECTRO-POLISHING |
|---|---|---|---|---|---|
| | | MECHANICAL POLISHING | ELECTRO-POLISHING | | |
| GAS EMISSION AMOUNTS | (0) | 0.2 | 0.7 | 2.9 | 13.2 14.6 |

(GAS EMISSION AMOUNT: $1E-7 Pa \cdot m^3/s \cdot W \cdot cm^2$)

Since it is difficult to measure a gas emission amount due to the light irradiations of the EUV light source from each absorber material without the EUV light source that associates with an inflow of gas, the gas emission amount from each absorber material shown in Table 1 corresponds to a difference from the gas emission amount of a single crystal silicon material that has the least gas emission amount. Each value shown in Table 1 is a value indicative of the gas emission amount from unit area by irradiation of the EUV light of unit power (wavelength 10–15 nm). Measurement was conducted after irradiation of EUV light to the absorber material for 30 hours for cleaning up the surface. When a value shown in Table 1 is smaller than $1E-7$ ($Pa \cdot m^3/S \cdot W \cdot cm^2$), it is sufficiently smaller than the gas flow from the EUV light source used for the instant embodiment, and suitable for the absorber.

A result shown in Table 1 clarified that copper or high purity silicon having a mechanical polished surface is suitable for the absorber 13 in measuring the actual gas flow. When copper is used, oxygen-free copper having less soluble gas element is preferable and a mechanically polished flat surface exhibited good performance. On the other hand, when silicon is used, high purity single crystal silicon that has a crystal cleavage plane cracked in vacuum and exposes a new flat surface emits less gas from the beginning of irradiations, and is suitable for the absorber 13.

A description will now be given of a method of measuring a type and inflow of gas molecules that flow in the EUV exposure apparatus from the EUV light source using a gas flow measurement apparatus for the EUV light source shown in FIG. 1.

In the first chamber 1 as the EUV light source, the LPP manner shown in FIG. 2 supplies xenon as a target material from a molybdenum nozzle, irradiates a high-intensity pulsed laser beam onto the target to emit plasma. The light radiated from plasma is condensed by a multilayer mirror, and forms a condensed point near a downstream end in the first chamber 1. The EUV light with a wavelength near 13.5 nm for use with exposure has an intensity of about 10 W. Argon as buffer gas was supplied to the first chamber 1 so as to prevent debris that occurs with plasma emissions from adhering to the multilayer mirror. The normal exposure introduces the condensed light into the EUV exposure apparatus, and illuminates a mask through a predetermined optical system to expose a resist on a wafer.

In general, a beam has a diameter of about Φ 5 mm at the condensed point formed near the downstream end in the first chamber 1, and the two-dimensional radiation angle is about 30° after the beam is condensed. The instant embodiment sets a distance between the condensed point and the absorber to 232 mm so that the light emitted from the EUV light source is irradiated onto the absorber 13. The absorber 13 has a disc shape with an outer diameter of Φ 140 mm and a thickness of 20 mm, and is arranged perpendicular to the light from the light source.

The absorber 13 used oxygen-free copper that caused few gas emissions in response to light irradiations, and a mechanically polished surface having flatness of 2 μm or smaller, onto which the EUV light is irradiated. It is preferable for reduced gas emissions to flatten a surface of the absorber 13 by polishing, and to reduce an actual surface area. A pipe with an outer diameter of 10 mm and an inner diameter of 6 mm is embedded in the absorber 13, and circulates room-temperature cooling pure water at speed of 2 L/min.

An inflow of gas molecules from the EUV light source is measured as follows: The gas flow measurement apparatus for the EUV light source includes the second chamber 2, directly connected to the EUV light source, which accommodates the absorber 13, and the third chamber 3 connected to the vacuum pump 6. The second and third chambers 2 and 3 are connected to each other via the orifice 4 with conductance C. The second and third chambers 2 and 3 are provided with vacuum gauges 5A and 5B for detecting respective internal pressures P1 and P2. In such a gas flow measurement apparatus, when the gas flux from the EUV light source is exhausted from the vacuum pump 6 via the orifice 4 to the outside of the system, the gas flow from the EUV light source becomes equal to the gas flow that passes through the orifice 4. Equation 1 provides the gas flow Q that passes through the orifice 4, where C is the conductance C of the orifice 4, P1 and P2 are internal pressures P1 and P2 in the second and third chambers 2 and 3:

$$Q=C(P1-P2) \qquad (1)$$

The gas flow from the EUV light source is calculated based on the flow calculated by Equation 1.

Prior to the experiment, baking was conducted at 200° C. for 12 hours after a sheath heater was wound around the second and third chambers 2 and 3 made of stainless steel.

The light emitted from the EUV light source has been irradiated onto the absorber 13 for about 30 hours in advance.

Under this condition, the degas flow Q1 from a wall of the second chamber 2 is measured while the gale valve 12 is closed. An opening diameter of the orifice 4 between the second and third chambers 2 and 3 was set to 5 mm, and the third chamber 3 was exhausted by the pump 6 with a volume exhaust speed of 300 L/s to create a difference in pressure between the second and third chambers 2 and 3. As a result, in the equilibrium state, the vacuum gauge 5A attached to the chamber 2 indicated a pressure of about 1E−2Pa, and the vacuum gauge 5B attached to the third chamber 3 indicated a pressure of about 5E−4 Pa. The inflow Q1 from the second chamber 2 to the third chamber 3 is calculated as Q1=2.2E−5 (Pa m$^3$/s) using the measurement value and the opening diameter of the orifice 4.

Next, the gate valve 12 was opened, and a similar measurement was conducted while the EUV light source emits. As a result, the vacuum gauge 5A attached to the second chamber 2 indicated a pressure of about 3.1E−1 Pa and the vacuum gauge 5A attached to the second chamber 2 indicated a pressure of about 7.2E−3 Pa. The inflow Q2 from the second chamber 2 to the third chamber 3 is calculated as Q2=6.9E−4 (Pa·m$^3$/s).

The gas flow Q3 from the EUV light source is calculated as a difference between Q2 and Q1, i.e., Q3=6.68E−4 (Pa·m$^3$/s).

In order to confirm the effect of use of oxygen-free copper for the absorber 13, stainless that constitutes the chamber was attached as the absorber 13, and a comparative experiment was conducted. In this case, when the gate valve 12 was closed, it was calculated that Q1'=2.2E−5 (Pa·m$^3$/s) equivalent to oxygen-free copper is flowed in the third chamber 3. On the other hand, while the EUV light source emitted the light, the vacuum gauge 5A attached to the second chamber 2 indicated a pressure about 5.1E−1 Pa, and the vacuum gauge 5B attached to the second chamber 3 indicated a pressure about 9.0E−3 Pa. As a result, the flow Q2' from the second chamber 2 to the third chamber 3 was calculated as Q2'=1.14E−3 (Pa·m$^3$/s).

Therefore, the apparent gas flow Q3' from the EUV light source, which is calculated from a difference between Q2' and Q1' as Q3'=1.12E−3 (Pa·m$^3$/s), showing a significant difference from Q3. Presumably, this difference results from gas molecules emitted from the stainless material used for the absorber 13 due to the light irradiations. This result also clearly supports that the absorber 13 made of oxygen-free copper can measure the gas inflow from the EUV light source, which is close to the actual value.

In addition, the gas molecules having a mass number of 44, presumably SiO, was observed in addition to xenon used for the target material and argon as the buffer gas in view of the measurement result of the mass spectrometer 7. Presumably, this product results from oxygen that slightly exists in the chamber reacts with silicon in the multilayer mirror.

As discussed, a gas flow measurement apparatus that irradiates light emitted from an EUV light source onto an absorber made of a material that causes few gas emissions, and a measurement method using the same, can prevent emissions of gas from the chamber wall due to light irradiation, and precisely measure a type and flow of the gas molecules emitted from the EUV light source to the EUV exposure apparatus.

What is claimed is:

1. A gas flow measurement apparatus that measures flow of gas emitted from a light source chamber that accommodates an EUV light source, said gas flow measurement apparatus comprising:
   an absorber receiving light emitted from the EUV light source;
   an orifice including an opening; and
   a measurement chamber connecting to a space that accommodates the absorber via the opening,
   wherein said opening of the orifice is provided outside of an optical path of the light emitted from the EUV light.

2. A gas flow measurement apparatus that measures flow of gas emitted from a light source chamber that accommodates an EUV light source, said gas flow measurement apparatus comprising:
   an absorber receiving light emitted from the EUV light source,
   wherein said absorber has a speed of gas emitted per a unit area due to light emitted from the EUV light source is 1E−7 (Pa·m$^3$/s·W·cm$^2$) or smaller.

3. A gas flow measurement apparatus that measures flow of gas emitted from a light source chamber that accommodates an EUV light source, said gas flow measurement apparatus comprising:
   an absorber receiving light emitted from the EUV light source,
   wherein said absorber is made of copper or silicon.

4. A gas flow measurement apparatus that measures flow of gas emitted from a light source chamber that accommodates an EUV light source, said gas flow measurement apparatus comprising:
   an absorber receiving light emitted from the EUV light source,
   wherein said absorber is made of copper or silicon, and
   wherein said absorber has a surface that has been made approximately flat by mechanical polishing or electropolishing.

5. A gas flow measurement apparatus that measures flow of gas emitted from a light source chamber that accommodates an EUV light source, said gas flow measurement apparatus comprising:
   an absorber receiving light emitted from EUV light source,
   wherein said absorber is made of single crystal silicon, and forms an optical initiation surface due to cracks along a cleavage plane in the crystal.

6. A gas flow measurement apparatus that measures flow of gas emitted from a light source chamber that accommodates an EUV light source, said gas flow measurement apparatus comprising:
   an absorber receiving light emitted from the EUV light source, said gas
   wherein said absorber includes a cooling mechanism.

7. A gas flow measuring method that measures a flow of gas emitted from a light source chamber that accommodates a EUV light source using a gas flow measurement apparatus that measures flow of gas emitted from the light source chamber, said gas flow measurement apparatus comprising:
   an absorber receiving light emitted from the EUV light source; and
   an orifice including an opening; and
   a measurement chamber connecting to a space that accommodates the absorber via the orifice,
   wherein said opening of the orifice is provided outside of an optical path.

8. A gas flow measurement apparatus that measures flow of gas emitted from a light source chamber that accommodates an EUV light source, said gas flow measurement apparatus comprising:
an absorber receiving light emitted from the EUV light source;
an absorbing chamber that accommodates the absorber;
an orifice including an opening; and
a measurement chamber that is connected to the absorbing chamber via the opening of the orifice.

9. A gas flow measurement apparatus according to claim 8, wherein said opening of the orifice is provided outside of an optical path of the light emitted From the EUV light.

10. A gas flow measuring method that measures a flow of gas emitted from a light source chamber that accommodates an EUV light source using a gas flow measurement apparatus that measures flow of gas emitted From the light source chamber, said gas flow measurement apparatus comprising:
an absorber receiving light emitted from the EUV light source,
wherein said absorber has a speed of gas emitted per a unit area due to light emitted from the EUV light source is 1E–7 ($Pa \cdot m^3/s \cdot W \cdot cm^2$) or smaller.

11. A gas flow measuring method that measures a flow of gas emitted from a light source chamber that accommodates an EUV light source using a gas flow measurement apparatus that measures flow of gas emitted from the light source chamber, said gas flow measurement apparatus comprising:
an absorber receiving light emitted from the EUV light source,
wherein said absorber is made of copper or silicon.

12. A gas flow measuring method that measures a flow of gas emitted from a light source chamber that accommodates an EUV light source using a gas flow measurement apparatus that measures flow of gas emitted from the light source chamber, said gas flow measurement apparatus comprising:
an absorber receiving light emitted from the EUV light source, wherein said absorber is made of copper or silicon, and
wherein said absorber has a surface that has been made approximately flat by mechanical polishing or electropolishing.

13. A gas flow measuring method that measures a flow of gas emitted from a light source chamber that accommodates an EUV light source using a gas flow measurement apparatus that measures flow of gas emitted from the light source chamber, said gas flow measurement apparatus comprising:
an absorber receiving light emitted from the EUV light source, wherein said absorber is made of single crystal silicon, and forms an optical irradiation surface due to cracks along a cleavage plane in the crystal.

14. A gas flow measuring method that measures a flow of gas emitted from a light source chamber that accommodates an EUV light source using a gas flow measurement apparatus that measures flow of gas emitted from the light source chamber, said gas flow measurement apparatus comprising:
an absorber receiving light emitted from the EUV light source,
wherein said absorber includes a cooling mechanism.

15. A gas flow measuring method that measures a flow of gas emitted from a light source chamber that accommodates an EUV light source using a gas flow measurement apparatus that measures flow of gas emitted from the light source chamber, said gas flow measurement apparatus comprising:
an absorber receiving light emitted from the EUV light source;
an absorbing chamber that accommodates the absorber;
an orifice including an opening; and
a measurement chamber that is connected to the absorbing chamber via the opening of the orifice.

* * * * *